(12) United States Patent
Ponzio et al.

(10) Patent No.: US 12,470,114 B2
(45) Date of Patent: Nov. 11, 2025

(54) APPARATUS FOR INSERTING AN UNDULATED COIL ASSEMBLY IN SLOTS OF A CORE OF A STATOR OF A DYNAMOELECTRIC MACHINE

(71) Applicant: ATOP S.p.A., Florence (IT)

(72) Inventors: Massimo Ponzio, Tavarnelle Val di Pesa (IT); Rubino Corbinelli, Pogginbonsi (IT); Federico Rossi, Viterbo (IT)

(73) Assignee: ATOP S.p.A., Florence (IT)

( * ) Notice: Subject to any disclaimer, the term of this patent is extended or adjusted under 35 U.S.C. 154(b) by 215 days.

(21) Appl. No.: 18/078,040

(22) Filed: Dec. 8, 2022

(65) Prior Publication Data

US 2023/0109380 A1    Apr. 6, 2023

Related U.S. Application Data

(62) Division of application No. 15/746,365, filed as application No. PCT/IB2016/054104 on Jul. 8, 2016, now Pat. No. 11,557,946.

(30) Foreign Application Priority Data

Jul. 20, 2015    (IT) .......................... 102015000035955

(51) Int. Cl.
    *H02K 15/066*    (2025.01)
    *H02K 3/12*        (2006.01)
    (Continued)

(52) U.S. Cl.
    CPC ............. *H02K 15/066* (2013.01); *H02K 3/12* (2013.01); *H02K 15/021* (2025.01);
    (Continued)

(58) Field of Classification Search
    CPC ........... H02K 15/0414; H02K 15/0428; H02K 15/064; H02K 15/066; H02K 3/12; H02K 15/0421; Y10T 29/53143
    See application file for complete search history.

(56) References Cited

U.S. PATENT DOCUMENTS

| | | | |
|---|---|---|---|
| 2,476,744 | A | 7/1949 | Leece |
| 3,543,337 | A | 12/1970 | Meyn et al. |

(Continued)

FOREIGN PATENT DOCUMENTS

| | | |
|---|---|---|
| DE | 112011100868 T5 | 12/2012 |
| EP | 1041696 A1 | 10/2000 |

(Continued)

OTHER PUBLICATIONS

Ogilvie et al, "Proposed methodology to combine design concept and manufacturing process selection for distributed wound stator cores," 2015 IEEE International Electric Machines & Drives Conference (IEMDC), Coeur d'Alene, ID, USA, 2015, pp. 1305-1311. (Year: 2015).*

(Continued)

*Primary Examiner* — A. Dexter Tugbang
(74) *Attorney, Agent, or Firm* — Cooley LLP

(57) ABSTRACT

Embodiments of the present invention are directed to an apparatus for inserting an undulated coil assembly in a plurality of slots of a hollow core of a stator of a dynamoelectric machine. In some embodiments, the hollow core includes a hollow core central rotation axis, the undulated coil assembly is formed by a plurality of undulated coils, and each of the plurality of undulated coils including adjacent superimposed linear portions (LI). At least three of the plurality of undulated coils extend parallel to each other and a plurality of turn portions (T) connecting the adjacent linear portions (LI) thereof. The apparatus includes, inter alia, a support member, a first guide device aligned with respect to (Continued)

each of the end faces and the plurality of slots of the hollow core, a passage associated with the first guide device which includes at least one guide surface, a feeder that feeds the first coil portion, and moving means for relatively moving the hollow core with respect to the first guide device to position the plurality of slots of the hollow core for receiving the superimposed linear portions (LI).

10 Claims, 5 Drawing Sheets

(51) Int. Cl.
  *H02K 15/021* (2025.01)
  *H02K 15/0414* (2025.01)
  *H02K 15/0428* (2025.01)
  *H02K 15/064* (2025.01)
  *H02K 15/0421* (2025.01)

(52) U.S. Cl.
  CPC ..... *H02K 15/0414* (2013.01); *H02K 15/0428* (2013.01); *H02K 15/064* (2013.01); *H02K 15/0421* (2013.01); *Y10T 29/49073* (2015.01); *Y10T 29/53143* (2015.01)

(56) References Cited

U.S. PATENT DOCUMENTS

| | | |
|---|---|---|
| 3,631,591 A | 1/1972 | Eminger et al. |
| 3,689,976 A | 9/1972 | Donovan |
| 4,052,783 A | 10/1977 | Shively |
| 4,727,742 A | 3/1988 | Weaver |
| 4,750,258 A | 6/1988 | Anderson |
| 4,901,433 A | 2/1990 | Barrera |
| 5,586,384 A | 12/1996 | Newman |
| 5,619,787 A | 4/1997 | Couture et al. |
| 6,140,735 A | 10/2000 | Kato et al. |
| 6,208,060 B1 | 3/2001 | Kusase et al. |
| 6,339,871 B1 | 1/2002 | Maesoba et al. |
| 6,376,961 B2 | 4/2002 | Murakami et al. |
| 6,389,678 B1 | 5/2002 | Ackermann et al. |
| 6,640,416 B1 | 11/2003 | Sadiku |
| 6,641,416 B2 | 11/2003 | Schulz et al. |
| 6,782,600 B2 | 8/2004 | Yamazaki et al. |
| 6,910,257 B1 * | 6/2005 | Gorohata ........... H02K 15/0428 310/156.01 |
| 7,210,215 B2 | 5/2007 | Kato et al. |
| 7,275,299 B2 | 10/2007 | Kuroyanagi et al. |
| 7,370,401 B2 | 5/2008 | Stratico et al. |
| 7,480,987 B1 | 1/2009 | Guercioni |
| 7,624,493 B2 | 12/2009 | Hirota et al. |
| 7,730,401 B2 | 6/2010 | Gillespie et al. |
| 7,941,910 B2 | 5/2011 | Guercioni |
| 8,215,000 B2 | 7/2012 | Guercioni |
| 8,296,926 B2 | 10/2012 | Wang et al. |
| 8,424,792 B2 | 4/2013 | Ponzio et al. |
| 8,555,694 B2 | 10/2013 | Saito et al. |
| 8,607,436 B2 | 12/2013 | Ponzio et al. |
| 8,667,666 B2 | 3/2014 | Sadiku et al. |
| 8,826,513 B2 | 9/2014 | Guercioni |
| 8,918,986 B2 | 12/2014 | Guercioni |
| 8,922,078 B2 | 12/2014 | Guercioni |
| 9,300,193 B2 | 3/2016 | Guercioni |
| 9,455,614 B2 | 9/2016 | Corbinelli et al. |
| 9,467,029 B2 | 10/2016 | Ponzio et al. |
| 9,479,033 B2 | 10/2016 | Ponzio et al. |
| 9,520,762 B2 | 12/2016 | Guercioni |
| 9,692,283 B2 | 6/2017 | Ponzio et al. |
| 9,722,475 B2 | 8/2017 | Niccolini et al. |
| 9,755,487 B2 | 9/2017 | Ponzio et al. |
| 10,050,498 B2 | 8/2018 | Ponzio et al. |
| 10,224,789 B2 | 3/2019 | Corbinelli et al. |
| 10,305,354 B2 | 5/2019 | Niccolini et al. |
| 10,411,570 B2 | 9/2019 | Ponzio et al. |
| 10,749,418 B2 | 8/2020 | Ponzio et al. |
| 11,336,160 B2 | 5/2022 | Ponzio et al. |
| 11,557,946 B2 | 1/2023 | Ponzio et al. |
| 2001/0007169 A1 | 7/2001 | Takahashi et al. |
| 2002/0017585 A1 | 2/2002 | Haruta et al. |
| 2002/0053126 A1 | 5/2002 | Maeda et al. |
| 2002/0089250 A1 | 7/2002 | Naka et al. |
| 2003/0137207 A1 | 7/2003 | Tamura et al. |
| 2003/0159270 A1 | 8/2003 | Kato |
| 2003/0233748 A1 | 12/2003 | Gorohata et al. |
| 2004/0040142 A1 | 3/2004 | Hirota et al. |
| 2005/0236509 A1 | 10/2005 | Burch et al. |
| 2006/0001327 A1 | 1/2006 | Ossenkopp et al. |
| 2006/0022547 A1 | 2/2006 | Sadiku et al. |
| 2008/0148794 A1 | 6/2008 | Patterson et al. |
| 2009/0233748 A1 | 9/2009 | Boddy |
| 2009/0249853 A1 | 10/2009 | Young et al. |
| 2010/0325875 A1 | 12/2010 | Ponzio et al. |
| 2013/0162072 A1 | 6/2013 | Mizutani et al. |
| 2014/0007415 A1 | 1/2014 | Corbinelli |
| 2014/0015366 A1 | 1/2014 | Guercioni |
| 2014/0090240 A1 | 4/2014 | Ponzio |
| 2014/0196282 A1 | 7/2014 | Stephenson et al. |
| 2014/0300239 A1 | 10/2014 | Takizawa et al. |
| 2016/0254733 A1 | 9/2016 | Niccolini et al. |
| 2016/0365777 A1 | 12/2016 | Corbinelli |
| 2017/0012511 A1 | 1/2017 | Ponzio et al. |
| 2017/0019003 A1 | 1/2017 | Ponzio et al. |
| 2017/0302143 A1 | 10/2017 | Niccolini et al. |
| 2018/0233999 A1 | 8/2018 | Ponzio et al. |
| 2018/0294700 A1 | 10/2018 | Ponzio et al. |
| 2020/0381983 A1 | 12/2020 | Ponzio et al. |
| 2022/0278597 A1 | 9/2022 | Ponzio et al. |

FOREIGN PATENT DOCUMENTS

| | | |
|---|---|---|
| EP | 1041702 A2 | 10/2000 |
| EP | 1043828 A2 | 10/2000 |
| EP | 1061635 A2 | 12/2000 |
| EP | 1304789 A1 | 4/2003 |
| EP | 1324463 A2 | 7/2003 |
| EP | 1328059 A2 | 7/2003 |
| EP | 1372242 A2 | 12/2003 |
| EP | 1376816 A2 | 1/2004 |
| EP | 1710896 A1 | 10/2006 |
| EP | 1727260 A2 | 11/2006 |
| EP | 1043828 B1 | 9/2009 |
| FR | 2845536 A1 | 4/2004 |
| FR | 2896351 A1 | 7/2007 |
| FR | 2968858 A1 | 6/2012 |
| GB | 644761 A | 10/1950 |
| GB | 1496445 A | 12/1977 |
| JP | 2004072839 A | 3/2004 |
| JP | 2013102569 A * | 5/2013 |
| WO | WO-2008108317 A1 | 9/2008 |
| WO | WO-2011004100 A2 | 1/2011 |
| WO | WO-2012119691 A1 | 9/2012 |
| WO | WO-2012156066 A2 | 11/2012 |
| WO | WO-2013190860 A1 | 12/2013 |

OTHER PUBLICATIONS

International Preliminary Report on Patentability dated Sep. 10, 2013 for International Application No. PCT/EP2012/000633, 6 pages.

International Search Report and Written Opinion, mailed Apr. 5, 2012, for International Application No. PCT/EP2012/000633, 9 pages.

Search Report and Written Opinion completed Nov. 8, 2011 for IT TO2011A000199, 8 pages.

International Preliminary Report on Patentability, dated Nov. 19, 2013, for International Application No. PCT/EP2012/002055, 5 pages.

Search Report and Written Opinion completed Feb. 2, 2012 for IT TO2011A000435, 6 pages.

(56) References Cited

OTHER PUBLICATIONS

International Search Report and Written Opinion, mailed May 4, 2015 for International Application No. PCT/EP2014/071226, 8 pages.
International Search Report and Written Opinion, mailed Jun. 19, 2015, for International Application No. PCT/EP2015/054254, 8 pages.
International Search Report and Written Opinion, mailed Jul. 20, 2016 for International Application No. PCT/IB2016/052200, 15 pages.
International Search Report and Written Opinion mailed Jan. 23, 2013 for International Application No. PCT/EP2012/0002055, 7 pages.
Search Report and Written Opinion, completed Jul. 28, 2014, for IT P120130092, 7 pages.
Search Report for Italian Patent Application No. PI2015000031, completed Jan. 14, 2016, 9 pages.
Search Report for Italian Patent Application No. PI2015000032, completed Jan. 15, 2016, 8 pages.
Search Report for Italian Patent Application No. PI2015000033, completed Jan. 18, 2016, 8 pages.
Search Report for Italian Patent Application No. PI2015000034, completed Feb. 1, 2016, 8 pages.
Search Report for Italian Application No. IT 201700036222, completed Dec. 20, 2017, with English claims translation, 16 pages.

* cited by examiner

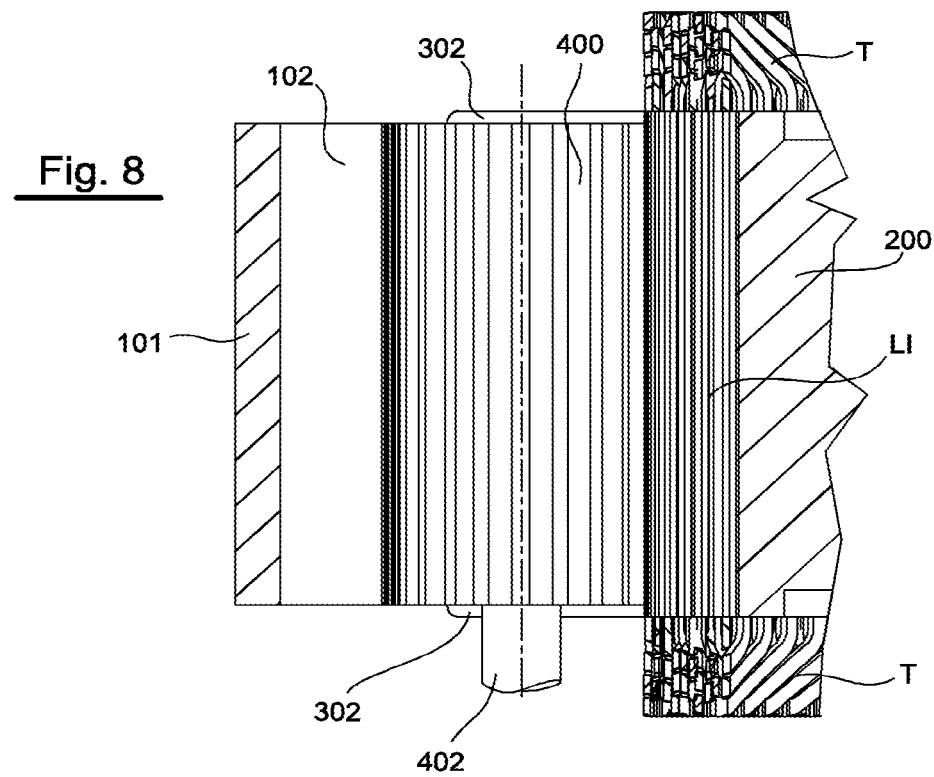
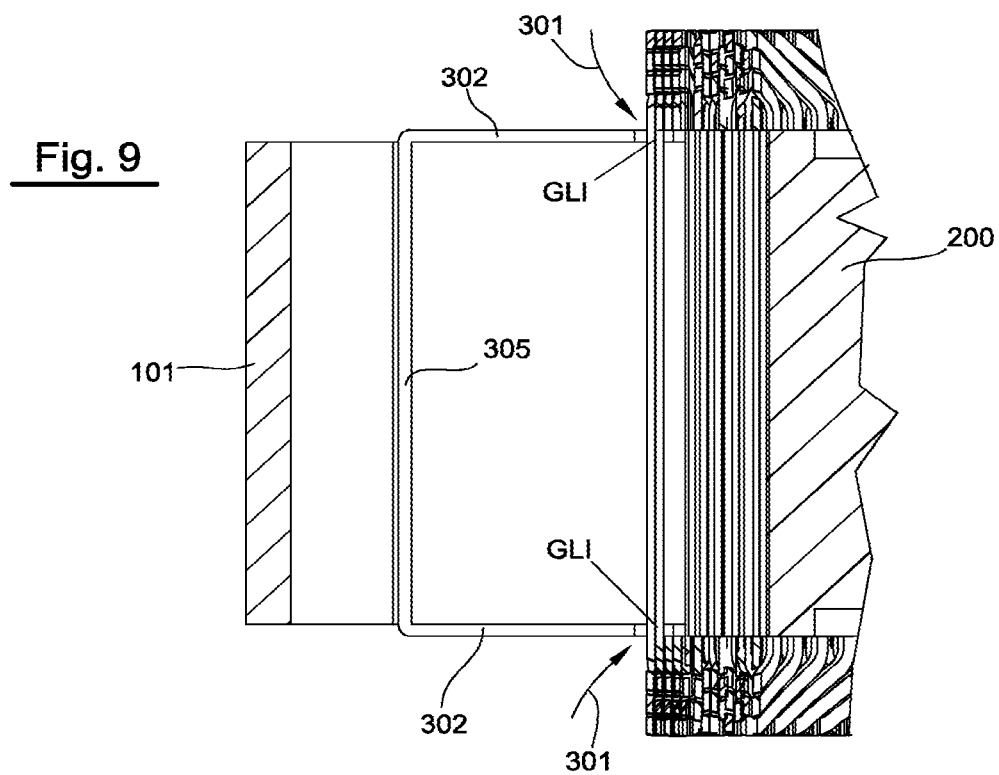

APPARATUS FOR INSERTING AN UNDULATED COIL ASSEMBLY IN SLOTS OF A CORE OF A STATOR OF A DYNAMOELECTRIC MACHINE

CROSS REFERENCE TO RELATED APPLICATIONS

This application is a divisional of U.S. patent application Ser. No. 15/746,365, filed Jan. 19, 2018, which claims priority to International Patent Application No. PCT/IB2016/054104, filed Jul. 8, 2016, which claims priority to Italian Patent Application No. 102015000035955, filed Jul. 20, 2015. The present application incorporates herein by reference the disclosures of each of the above-referenced applications in their entireties.

FIELD OF THE INVENTION

The present invention relates to a method and apparatus for inserting conductor coils in cores of dynamoelectric cores, particularly stator cores.

STATE OF THE ART

A coil, which is inserted, has adjacent linear portions extending parallel to each other, and a plurality of turn portions for connecting the adjacent linear portions with each other. The turn portions are alternately at one end side and at another other end side of the linear portions. The general form of the coil is normally designated undulated coil, or wave wound coil.

The linear portions are inserted in slots of a stator core, whilst the turn portions protrude from respective end sides of the stator core. The section of the conductor from which the coil is formed may be circular, square or rectangular. The size of the section of the conductor is usually comparable to the width of the slot section of the core. The cross sections of the conductors present in a slot are normally positioned one adjacent to another in a radial direction of the stator core, i.e. along a radial extension of the core, which extends from a slot entrance to the bottom of the same slot.

For reasons of clarity, a coil formed from one conductor having the undulated configuration will be referred to as a coil. A number of coils having the aforementioned configuration, and which are assembled together will be referred to as a coil assembly.

A particular case can be that of the coil assembly formed according to a woven configuration.

When examining a conductor of the coil assembly formed according to a woven configuration, the linear portions are positioned alternatively above and below the linear portions of another conductor along the coil assembly. The positioning of this superposition for a same conductor is repeated at a predetermined distance for a certain number of undulations. The turn portions joining these linear portions are positioned to be partially above and partially below turn portions of the other coils.

Solutions for producing woven coil assemblies of undulated coils have been described in U.S. Pat. Nos. 8,122,593, 6,376,961 and Italian application PI 2015A000031.

A non woven or layered flat coil assembly consists of a certain number of undulated coils each formed from a respective conductor and having a same pitch distance separating the linear portions. Therefore, a layered flat coil assembly consists of a number of single flat coils having linear portions that are adjacent to each other connected by turn portions.

The single flat coils are layered one on top of the other by superimposing linear portions one on top of the other, although one coil, which is immediately above another coil, will have linear portions shifted by the common pitch distance separating the adjacent linear portions. The result is a layered coil assembly having a multiple number of two superimposed linear portions like in the woven configuration, but with the turn portions simply superimposed. External leads of the layered assembly can connect one coil to another of the layers in order to achieve a required electric scheme that is equivalent to the scheme of the woven configuration.

Stator cores wound according to these principles can be used in dynamoelectric machines; in particular to act as traction motors and energy generators for vehicles.

The linear portions of the woven or layered coil assemblies will be superimposed to be seated in a same slot of the core, whilst the turn portions will be partially superimposed according to a certain progression, and remain positioned at the ends of the stator core, outside the slots.

Normally, a compression is required on the flat coil assembly to reduce the overall thickness. Prior to the compression, the linear portions, and the turn portions need to be positioned extremely precisely in view of the low allowable tolerances that exist during the successive insertion operations in the core.

A traditional principle of inserting the coil assembly is to transfer the flat coil onto a cylindrical arbor, where seats are present for positioning the linear portions in the angular positions matching the angular position where the linear portions need to be inserted. Pushing members of the arbor push the linear portions into aligned slots of the core by moving along radial directions corresponding to specific angular positions where the linear portions need to be located in the slots. A solution according to these principles is described in U.S. Pat. No. 7,367,106.

This type of insertion maintains the cross sections of the superimposed linear portions at a constant angle with respect to the radial insertion direction. Accordingly, the orientation of the cross section remains at a zero angle with respect to the radial direction of the core.

The zero angle requires that pitch distance separating adjacent superimposed linear portions be the same as the angular distance separating the entrance of adjacent slots, otherwise the superimposed linear portions are not aligned with the entrances of the slots, with the consequence that the superimposed linear portions cannot be inserted.

Considering that during the insertion, the superimposed linear portions need to move from an internal diameter circumference corresponding to the slot entrances to a more external diameter circumference corresponding to the final position of the superimposed linear portions. In this situation, the insertion of the superimposed linear portions having the pitch distance equal to the distance separating the entrances has the effect of straining the relative conductors and pulling the turn portions towards the faces of the stator core when the linear portions are moved along the radial distance of the slots. These effects increase for superimposed linear portions, which are positioned on a more external diameter circumference of the slots, i.e. are positioned at greater radial distances of the slots.

Documents US 2014/0196282 and FR 2896351 describe solutions for transferring undulated coils from a linear support having slots to a cylindrical support also having slots. The guide device of these documents does not change orientation of the linear portions of the undulated coils during the insertion of the coils in the slots.

Documents WO 2008/108317, U.S. Pat. No. 5,619,787 concern coil members, which are not undulated coils. The linear portions of the coils members change in orientation prior to, or during, insertion in the slots. The solutions of these documents are not applicable to insertion of the linear portions of undulated coils.

SUMMARY OF THE INVENTION

It is an object of the present invention to provide an improved method and apparatus for inserting undulated coil assemblies in the slots of cores of dynamo electric machines.

It is also an object of the present invention to provide a core of a dynamo electric machine wound with undulated coil assemblies, where the pitch distance between adjacent superimposed linear portion varies depending on the radial position that the superimposed linear position have within the slots of the core.

These and other objects are achieved using the method and the apparatus for forming woven coils as described in the independent claims.

Other characteristics of the inventions are described in the dependent claims.

BRIEF DESCRIPTION OF THE DRAWINGS

The invention will be now shown with the following description of an exemplary embodiment, exemplifying but not limitative, with reference to the attached drawings in which:

FIG. 8 is a partial section view as seen from direction 8-8 of FIG. 3;

FIG. 9 is a partial section view as seen from direction 9-9 of FIG. 3.

DETAILED DESCRIPTION OF THE INVENTION

Figure 1:
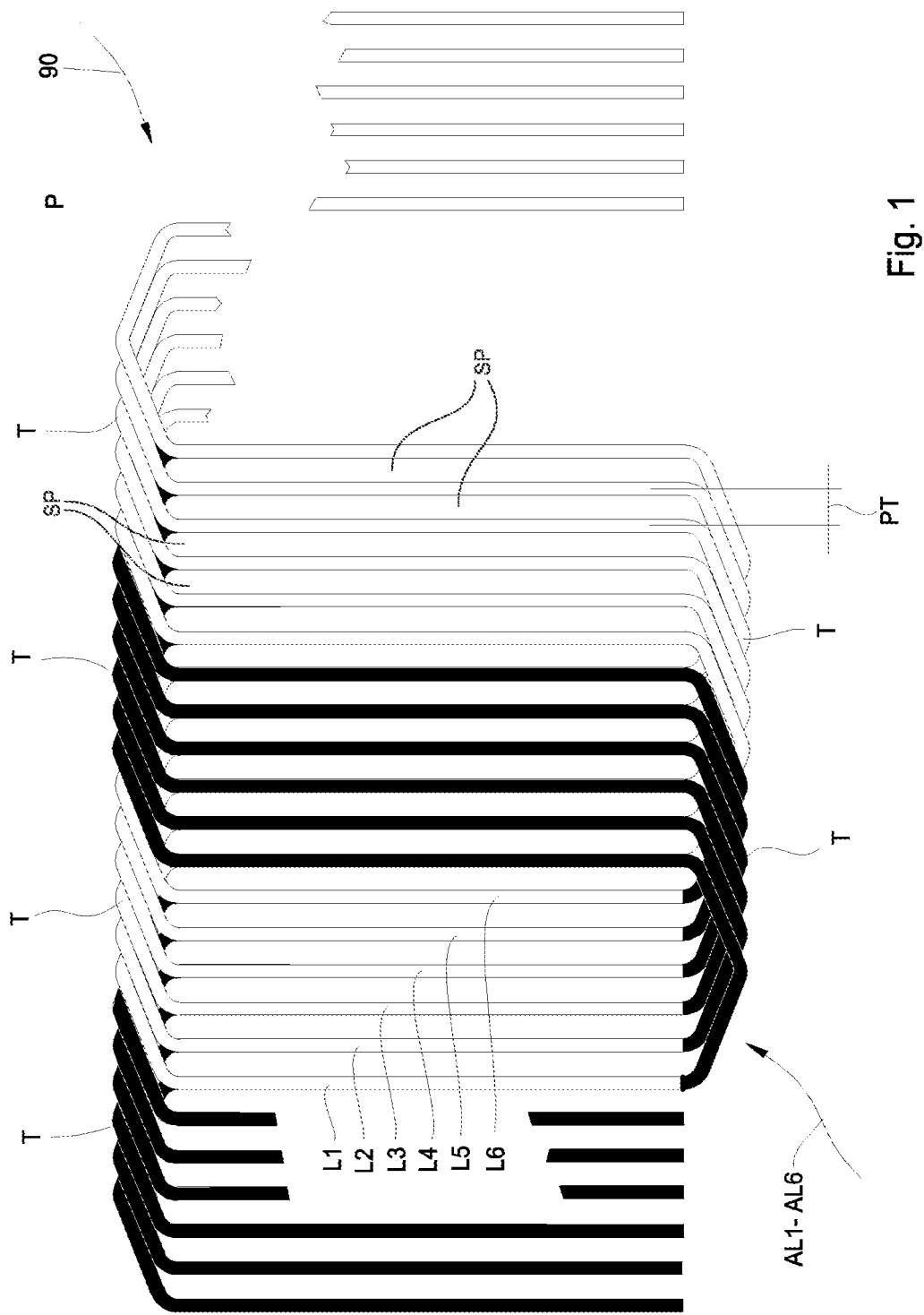
FIG. 1 is a planar view of a woven coil assembly.

A portion of an undulated woven coil assembly 90 consisting of twelve wire conductors is shown in FIG. 1. Coil assembly 90 is a flat coil assembly parallel to the plane P of the drawing of FIG. 1. The coil assembly 90 of FIG. 1 can be considered to be an interlacing of coil portions. More particularly, the coil assembly consists of a repetition of areas of six linear portions L1-L6 of coil superimposed on six linear portions AL1-AL6. Consequently two superimposed linear portions are at a pitch distance PT from two adjacent linear portions, as shown in FIG. 1.

A coil assembly according to these characteristics, together with methods and devices for achieving the flat configuration shown in FIG. 1, have been described in Italian Patent Application No. PI2015A000031.

Figure 2:
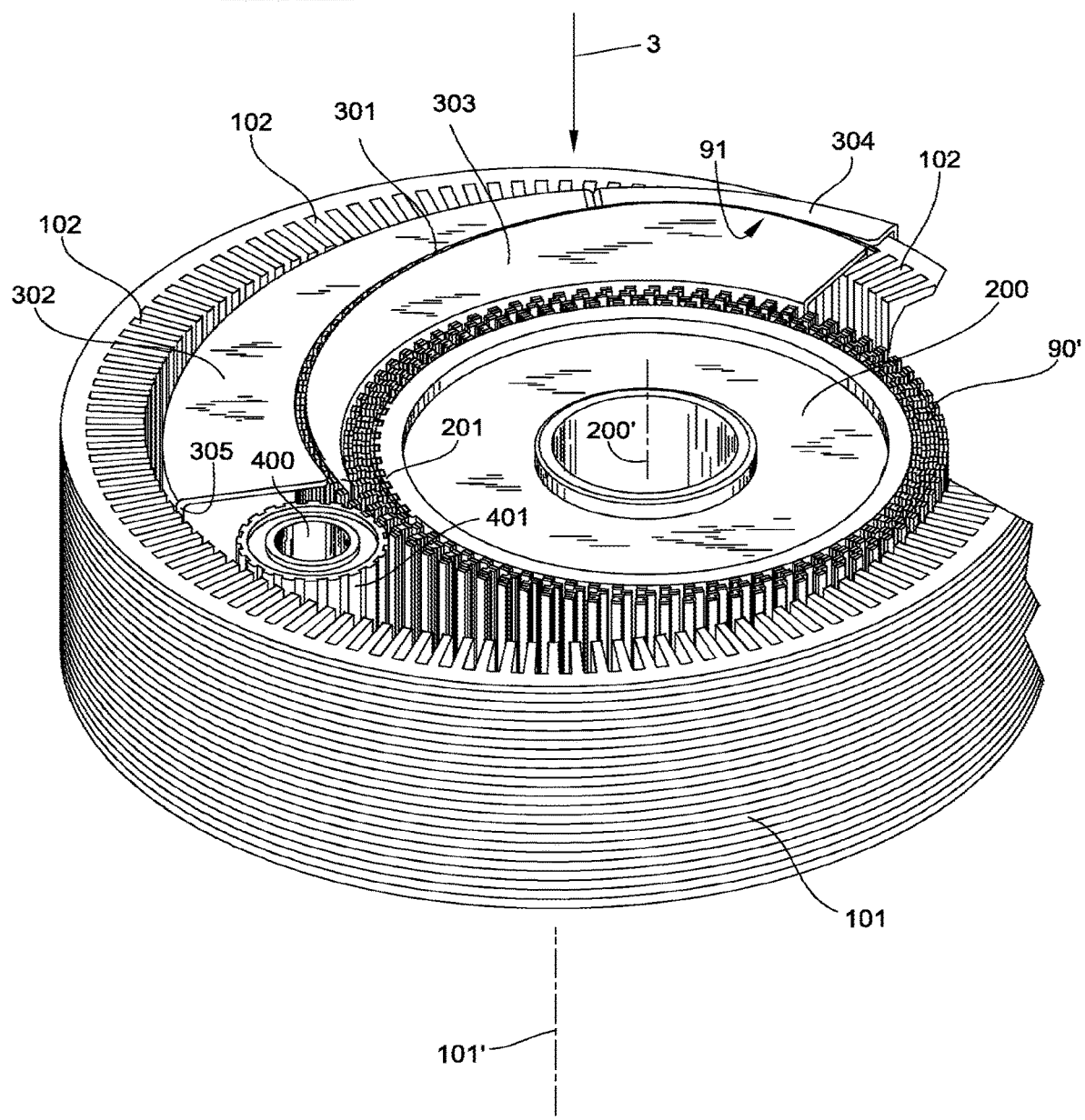
FIG. 2 is a schematic perspective view illustrating devices of the invention required for inserting coil assemblies according to the invention.
Figure 3:
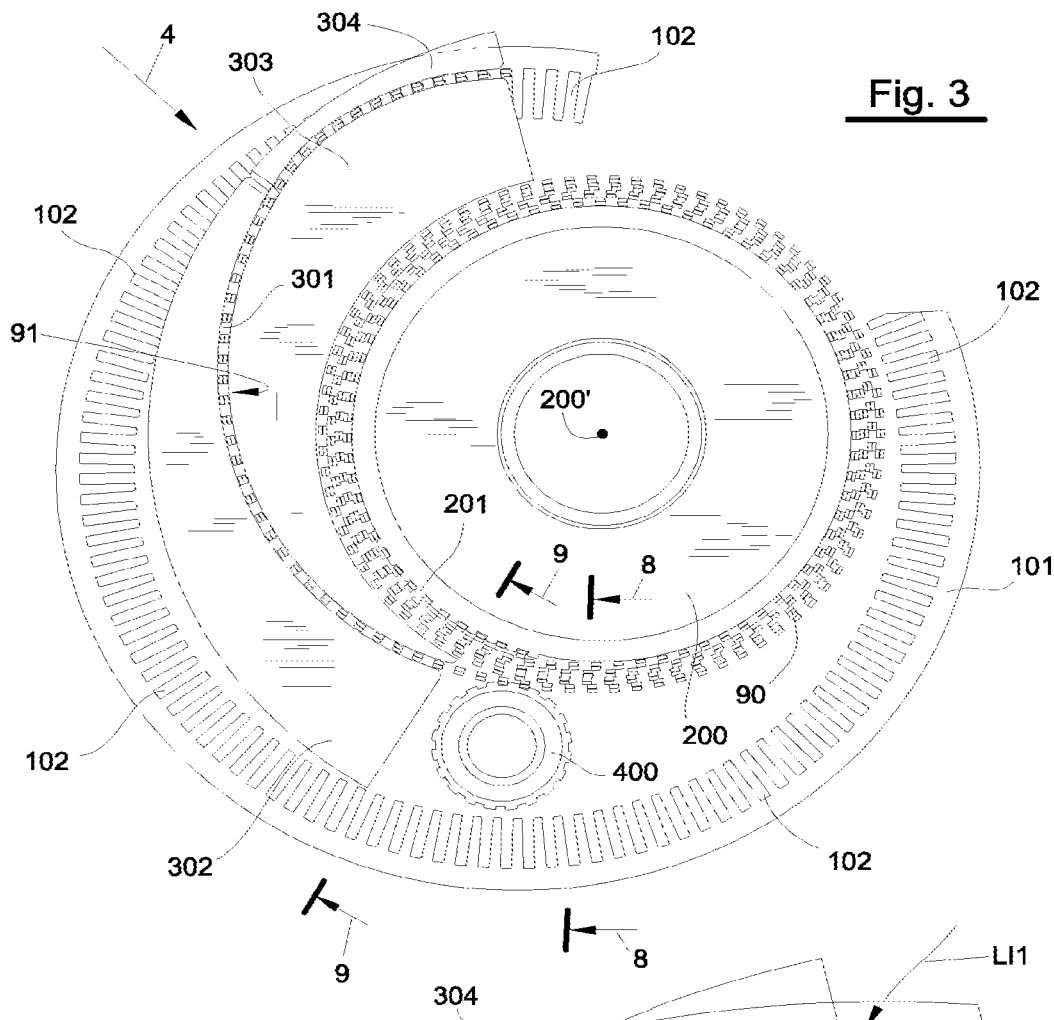
FIG. 3 is a view as seen from directions 3 of FIG. 2.
Figure 7:
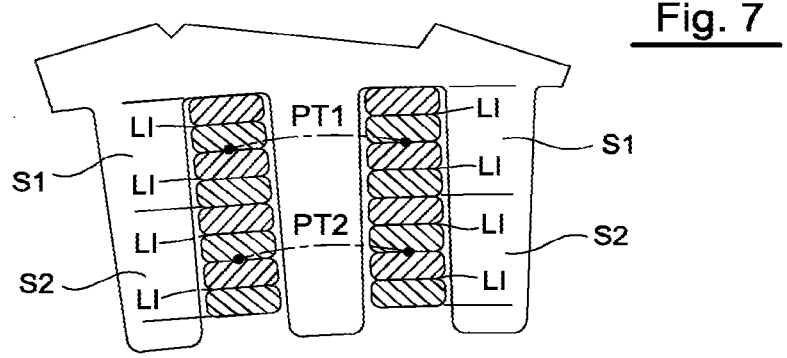
FIG. 7 is an enlarged partial view similar to that of FIG. 3 illustrating two adjacent slots of a core that have been filled.

A stator core 101, which receives the coil assembly of FIG. 1 is shown in FIGS. 2 and 3. The stator core will have a number of slots 102 proportional to the total number of superimposed linear portions LI. This total includes the linear portions of superimposed initial and final leads. As a result, in a slot 102, two superimposed linear portions LI can be accommodated on two other superimposed linear portions LI, which can be accommodated on other two superimposed linear portions LI, as shown in FIG. 7. Two superimposed linear portions are for example like linear portion L1 superimposed on linear portion AL1, or like linear portion L2 superimposed on linear portion AL2 of FIG. 1. This will depend on the number of superimposed linear portions LI present in the coil assembly, which has been formed. The example of FIG. 7 shows the case where a slot contains 4 pairs of superimposed linear portions LI, which corresponds to 8 conductors present in a slot 102. In the following, the terminology linear portions LI, when referred to the object being inserted, will mean two superimposed linear portions, like has been described in the foregoing. These two superimposed linear portions need to be inserted in a same slot 102.

Figure 5:
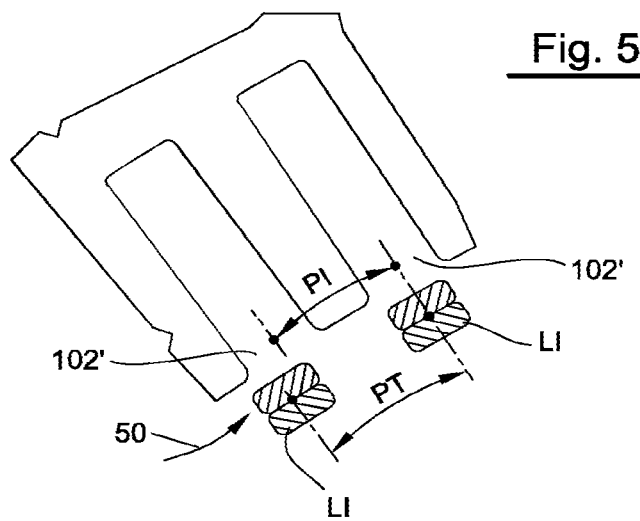
FIG. 5 is an enlarged partial view similar to that of FIG. 3 of two adjacent slots of a core.

With reference to FIG. 5, according to the invention linear portions LI, which are in adjacent slots, will be separated by a pitch distance PT, which is greater than the pitch distance PI which separates the entrances of the slots 102'. In this situation, at least linear portions 50 will not be sufficiently aligned with the entrance of slot 102', and therefore will not be able to enter slot 102'

Figure 6:
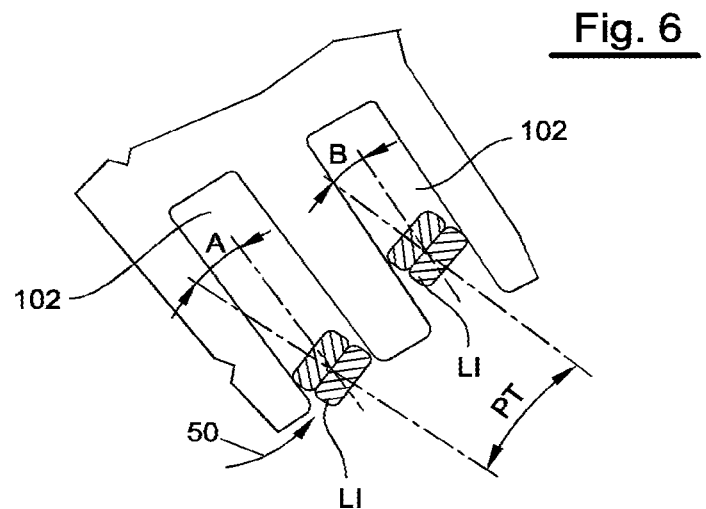
FIG. 6 is an enlarged partial view similar to that of FIG. 3 of two adjacent slots of a core during insertions steps according to the invention.

FIG. 6 shows instances of insertion of adjacent linear portions according to the principles of the invention. The adjacent linear portions have been rotated by angles A and B with respect to the radial directions of the slots 102. More particularly, at the instant of entering the slots 102 the angle will be A, whilst when the linear portion is further within the slots, the angle is B, which is smaller with respect to angle A. During the insertion according to these principles, the pitch distance PT between the adjacent linear portions LI remains constant.

As shown in the example of FIG. 7, according to the invention a predetermined number of linear portions LI positioned at or near to the bottom of the slots 102 will be wound and inserted having a pitch distance PT1, and a predetermined number of linear portions LI positioned at or near to the entrance of the slots will be wound and inserted having a pitch distance PT2.

In other words a certain set S1 of linear portions LI will have pitch distance PT1 and a second set S2 of linear portions LI will have pitch distance PT2, depending on the position that the linear portions LI have along the radius of the slots 102, as shown in FIG. 7.

Pitch distance PT1 will be larger than pitch distance PT2. This will result in the length of the turns T of the linear portions LI having the pitch distance PT1 longer than the length of the turns of the linear portions having the pitch distance PT2.

In this way, both the turns T of the linear portions will be more accurately positioned and tensioned. Accordingly, the stator core will have less height where the turns T are located, which achieves that the stator core 101 is more compact. Furthermore, there is an optimization of the length of conductor used to wind the coils of the stator core. Also, there is less variance in the electrical resistance of the coils, and the insulation of the conductors forming the coil assemblies is less subject to having areas of breakage.

FIGS. 2 and 3 illustrate a device of the invention, where a portion 90' of a flat coil 90 like that of FIG. 1, or a layered coil assembly, can be wound for a certain number of turns on a drum 200.

Drum 200 is provided with teeth 201 for engaging the tail end of the flat coil. By rotating drum 200 around longitudinal axis 200' of the drum, coil portion 90' unwinds from drum 200. In FIGS. 2 and 3, for reasons of clarity, turn portions T of the coil have been removed, although the turn portions T are visible in section views of FIGS. 8 and 9.

The leading portion 91 of coil 90 is directed through passage 301 of guide assembly 300. Passage 301 is delimited by guide plates 302, 303, 304.

Engagement wheel 400 is provided with teeth 401 for engaging the spacing SP existing between linear portions LI, as shown in FIGS. 2, 3 and 8. Rotation of engagement wheel 400 will feed the leading portion 91 of the flat coil through passage 301.

When engagement wheel 400 is being rotated, also drum 200 will be rotated to feed the leading portion 91 and unwind the rest of the coil portion 90' from drum 200 without modifying the pitch distance PT existing between the linear portions LI.

At the same time, stator core 101 is indexed by a rotation motion around longitudinal axis 101', which is the central longitudinal axis of the stator core 101, as shown in FIGS. 2 and 3.

Figure 4:
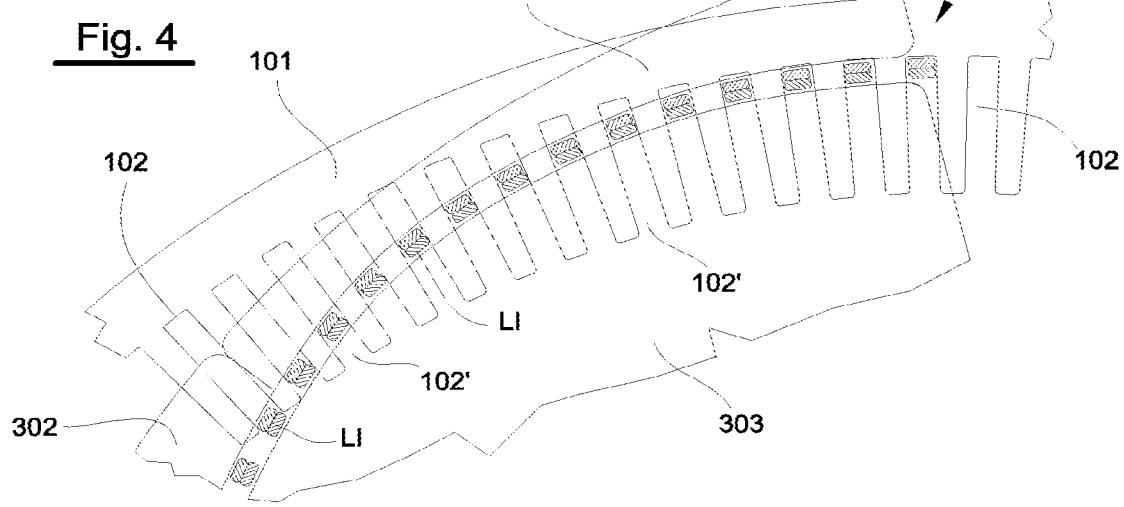
FIG. 4 is an enlarged view of area 4 of FIG. 3 with certain parts that are transparent for reasons of clarity.

With reference also to FIG. 4, rotation of drum 200, together with rotation of engagement wheel 400 and rotation of stator core 101 align each linear portion LI of the flat coil with a specific slot 102, where the linear portion LI needs to be inserted though the entrance 102', and thereafter positioned in the depth of a specific slot 102.

FIG. 4 illustrates how the configuration of the guide passage 301 and the described movements of the drum 200, the engagement wheel 400 and the stator core 101 progressively insert the linear portions LI in the respective slots 102, and position the linear portions at the required depth within the slots 102.

More particularly, engagement of the linear portions along the sides of the guide passage 301 during the above movements rotates, or orients, the linear portions LI, as has been described with reference to FIGS. 4 and 6, to insert the linear portions through the entrance 102' of the slots 102, and to continue to rotate, or orient, the linear portions at predetermined positions inside the slots 102. At all times of the rotation, or orientations, the pitch distance PT between linear portions LI remains constant, as shown in FIG. 6.

As shown in FIG. 4, and with reference to FIG. 6, during the described movements, angle A gradually reduces as the linear portions LI move within the slots by movement along passage 301 until the angle becomes zero when a linear portion leaves passage 301, and results positioned at a required final position within a slot 102 (see linear portions LI1 in FIG. 4).

The situation of FIG. 4 is the initial stage of the insertion of the flat coil, in which the linear portions become positioned at the bottom of the slots 102.

To obtain the insertion of a plurality of linear portions in a same slot, like is shown in FIG. 7, multiple synchronized 360° rotations of drum 200 and stator core 101 need to be accomplished. The number of these rotations depends on the number of linear portions of the flat coil, which need to be inserted in a same slot. Guide plate 304 needs to be separate from guide plate 302, so that plate 304 can be removed, when practically a full rotation of the stator core has occurred. In fact, in the final stage of a complete rotation of the stator, guide plate 304 will be occupying the place where successive turns of linear portions need to be inserted, as can be deduced from FIG. 4.

With reference to FIGS. 8 and 9 the guide plates 302, 303, 304 are duplicated on the opposite side of the stator core, so that the linear portions LI are guided by two aligned passages 301 to be parallel to the entrance of the slots, where the linear portion need to be inserted.

Structure 305 located in the stator core can be adopted for connecting the guide plates, as shown in FIGS. 2 and 9.

As shown in FIGS. 8 and 9, passages 301 can guide portions GL1 of linear portions LI. Guide portions GL1 can be at the ends of linear portions LI, and adjacent to turn portions T, as shown in FIG. 9.

A drive unit (not shown) is attached to shaft 402 of engagement wheel 400 for the rotation of guide wheel 400, as shown in FIG. 8.

In order to place all the linear portions LI in the slots 102, linear portions LI having different pitch distance PT2, as shown in FIG. 7, need to be in inserted in the part of the slot that is nearer to the entrance.

This can be achieved by winding a second flat coil to have pitch distance PT2. The second flat coil can be wound around another drum like 200 having teeth at a pitch distance PT2. Also, a second engagement wheel 400 will need to have a pitch distance PT2 between the teeth.

Furthermore, guide plates 302, 303 and 304 will need to form a passage having a configuration that progressively rotates, or orients the linear portions with specific angles for entering the slots and for maintaining pitch distance PT2 constant.

These different devices can be present in a second unit like that of FIG. 2, where the stator core 101 can be transferred and positioned for the successive insertion of the second flat coil having pitch distance PT2. This will avoid having to replace drum 200, engagement wheel 400, and guide plates 302, 303 and 304 in a single unit.

It will be appreciated that by means of device not shown the relative movement of the stator core 101 with respect to the guide passage 301 can be achieved with motions, which when combined together result in a rotation of the stator core around axis 101', or in other movements, which achieve the required insertion and final positioning in the slots 102 of the stator core.

It should also be appreciated that the passage 301 can be accomplished by means of a single guide surface along which the linear portions LI are caused to engage and move in order be rotated and inserted in the slots 102 of stator core 101, like occurs on guide surface of plate 303 when guide 304 is removed.

The foregoing description exemplary embodiments of the invention will so fully reveal the invention according to the conceptual point of view, so that others, by applying current knowledge, will be able to modify and/or adapt for various applications such embodiment without further research and without parting from the invention, and, accordingly, it is therefore to be understood that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. An apparatus for inserting an undulated coil assembly in a plurality of slots of a hollow core of a stator of a dynamoelectric machine, wherein:
   the hollow core includes a hollow core central rotation axis,
   the undulated coil assembly is formed by a plurality of undulated coils,
   each of the plurality of undulated coils includes adjacent superimposed linear portions,
   at least three of the plurality of undulated coils extend parallel to each other and a plurality of turn portions connect the adjacent superimposed linear portions thereof, and
   the turn portions are arranged alternately at one end side and at another end side of the adjacent superimposed linear portions,
the apparatus comprising:
   a support member including a support member central rotation axis, wherein at least a first coil portion of the undulated coil assembly is positioned around an external surface of the support member and respective linear portions of each of the undulated coils of the undulated coil assembly are arranged parallel to the hollow core central rotation axis;
   a first guide device aligned with respect to end faces of the hollow core and the plurality of slots of the hollow core;
   a passage of the first guide device comprising at least one guide surface where the adjacent superimposed linear portions are engaged to change an angular orientation of the adjacent superimposed linear portions with respect to radiuses of the plurality of slots of the hollow core during the insertion therein;
   a feeder that feeds the first coil portion from the support member along the passage of the first guide device to insert the adjacent superimposed linear portions in the plurality of slots of the hollow core; and
   wherein the hollow core is configured to move with respect to the first guide device to position the plurality of slots of the hollow core for receiving the adjacent superimposed linear portions.

2. The apparatus of claim 1, wherein:
   superimposed linear portions of a tail end of the first coil portion are engaged in a plurality of support member slots and further superimposed linear portions (LI) of the first coil portion are engaged by a feed member positioned between the support member and the support member slots; and
   movement of the support member is synchronized with movement of the feeder and the relative movement of the hollow core.

3. The apparatus of claim 1, further comprising:
   a second support member where a second coil portion is positioned around an external surface of the second support member;
   a second guide device aligned with respect to the end faces of the hollow core and the plurality of slots of the hollow core; and
   a second feeder configured to feed at least part of the second coil portion from the second support member along the second guide device so as to change orientation of the adjacent superimposed linear portions being fed, and to insert the adjacent superimposed linear portions being fed in the plurality of slots of the hollow core.

4. The apparatus of claim 1, wherein a terminal portion of the first guide device is removable to accomplish reorientation and insertion of adjacent superimposed linear portions in the plurality of slots of the hollow core.

5. The apparatus of claim 1, wherein the at least one guide surface is configured to reduce the angle of the angular orientation during the insertion in the plurality of slots of the hollow core.

6. The apparatus of claim 1, wherein the passage of the first guide device is arranged so as to reduce the angle of the angular orientation of the adjacent superimposed linear portions (LI) with respect to the radiuses of the plurality of slots of the hollow core during the insertion therein.

7. The apparatus of claim 1, wherein the support member is arranged inside the hollow core with the rotation axis positioned parallel to the rotation axis of the hollow core.

8. The apparatus of claim 1, wherein said feeder is arranged inside the hollow core.

9. The apparatus of claim 1, wherein the at least one guide surface of the guide device comprises at least two guide surfaces and are configured to be separated from each other in such a way that each guide surface can be removed when a full rotation of the stator has occurred in order to allow successive superimposed linear portions (LI)—to be inserted in the plurality of slots of the hollow core.

10. The apparatus of claim 1, wherein the feeder is arranged to be aligned between the support member and the first guide device.

* * * * *